Figure 5:
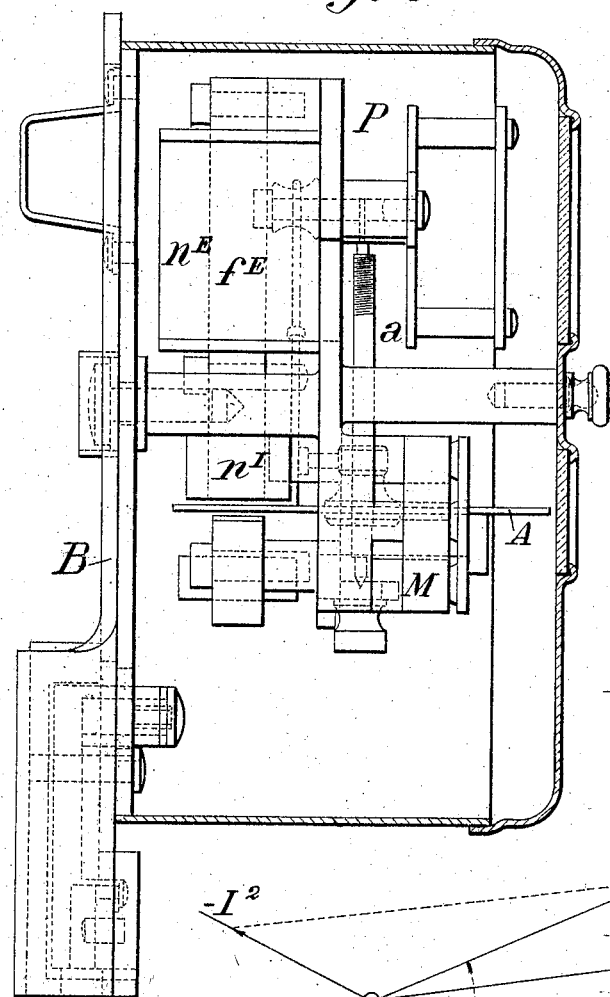

No. 778,101. PATENTED DEC. 20, 1904.
A. BLANCHET.
ELECTRICITY METER.
APPLICATION FILED OCT. 19, 1903.
NO MODEL. 3 SHEETS—SHEET 1.

Fig. 1.ª

Witnesses
Stephen Ginsta
Fred W. Englert

Inventor
A. Blanchet
By Wilkinson & Fisher
his Attorneys

No. 778,101. PATENTED DEC. 20, 1904.
A. BLANCHET.
ELECTRICITY METER.
APPLICATION FILED OCT. 19, 1903.
NO MODEL. 3 SHEETS—SHEET 2.

Witnesses—
J. Stephen Ginista
John H. Holk

Inventor
Arthur Blanchet
By Wilkinson & Fisher
his Attorneys.

No. 778,101.

Patented December 20, 1904.

UNITED STATES PATENT OFFICE.

ARTHUR BLANCHET, OF PARIS, FRANCE, ASSIGNOR TO COMPAGNIE POUR LA FABRICATION DES COMPTEURS & MATÉRIEL D'USINES À GAZ, OF PARIS, FRANCE.

ELECTRICITY-METER.

SPECIFICATION forming part of Letters Patent No. 778,101, dated December 20, 1904.

Application filed October 19, 1903. Serial No. 177,667.

*To all whom it may concern:*

Be it known that I, ARTHUR BLANCHET, engineer, a citizen of the Republic of France, residing at 16 Boulevard de Vaugirard, Paris, France, (post-office address,) have invented a new and useful Improvement in Electricity-Meters, (for which Letters Patent have been applied for in France under date of December 16, 1902, No. 327,363; in Germany under date of February 12, 1903; in Austria under date of February 18, 1903; in Hungary under date of February 23, 1903; in Switzerland under date of April 30, 1903; in Italy under date of May 2, 1903, and in Spain under date of May 4, 1903,) of which the following is a specification.

The present invention relates to a meter for alternating currents especially intended for use with single-phase alternating currents. It belongs to the induction-motor type in which the rotation of an armature (disk or cylinder) is produced by the action of currents induced by two fields displaced in phase, one of which is proportional to potential difference and the other to current.

It is known that in order to obtain a meter exactly recording the watts, taking into account the phase displacement, it is necessary to have the shunt-field produced by the voltage of the line displaced a fourth of a period with respect to the field produced by the main current. My meter is based on a new arrangement which renders it possible to easily realize this condition. It consists in the combination, with a shunt-electromagnet having either by itself or by addition of a choking-coil a high self-induction, of a differential electromagnet energized at one side in the positive sense by a component of current which corresponds in phase with the main current or leads on the latter and at the other side in the negative sense by a component of current which lags behind the main current. The relative displacement of both components and their absolute values are selected and regulated so that the resulting field is displaced a fourth of a period relatively to the shunt-field when voltage and current correspond in phase. The practical device used in order to obtain this result consists in dividing the main current into two branches, the first of which (which may in some cases include the whole current) energizes in the positive sense (corresponding to the rotation of the armature) an electromagnet having a low self-induction, while the second branch or shunt energizes an electromagnet having a high self-induction, acting inversely of the first one, the whole constituting the field of the above-mentioned differential electromagnet. It is of course possible instead of combining a differential field to combine differentially with the shunt-field energized by voltage two electromagnets energized by components of the main current having the same relation as in the first case as to intensity and displacement.

The principle of my meter being well understood, I shall describe hereinafter by way of an example a suitable form of execution.

Figure 1:
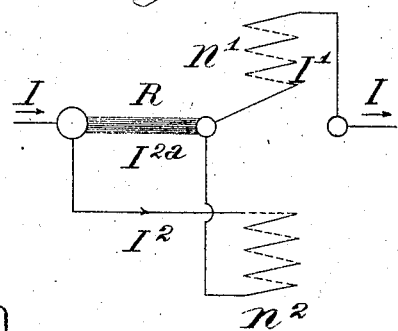
Figure 3:
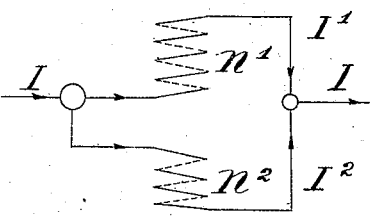
Figure 3:
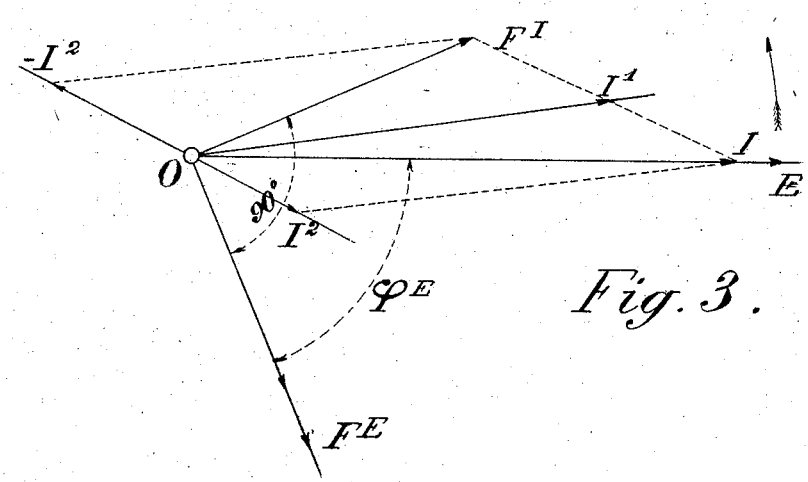
Figure 2:
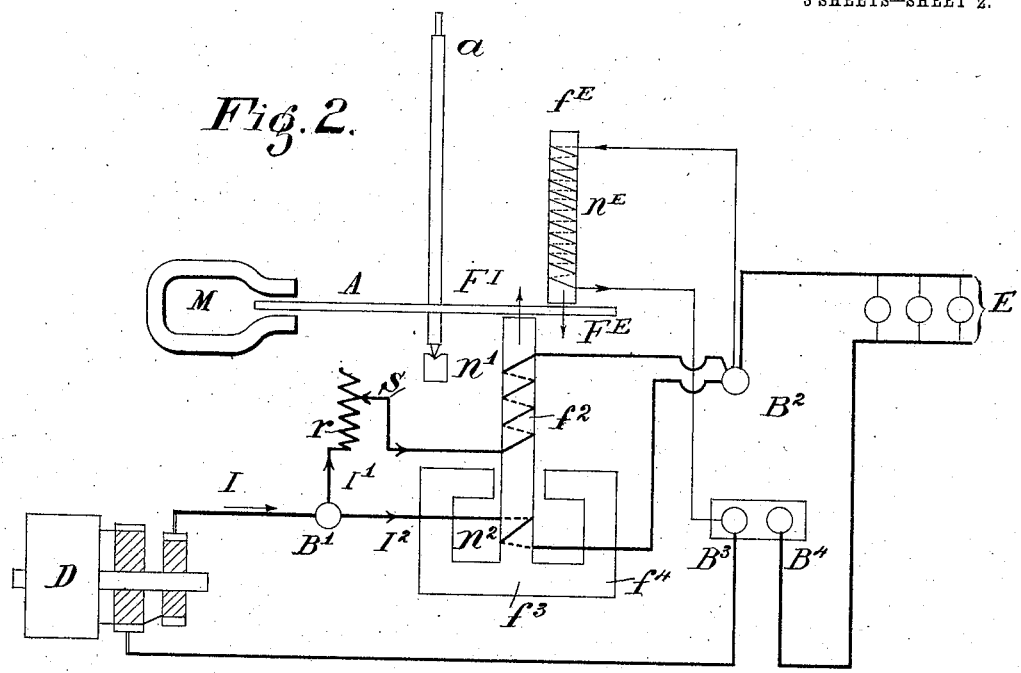
Figure 6:
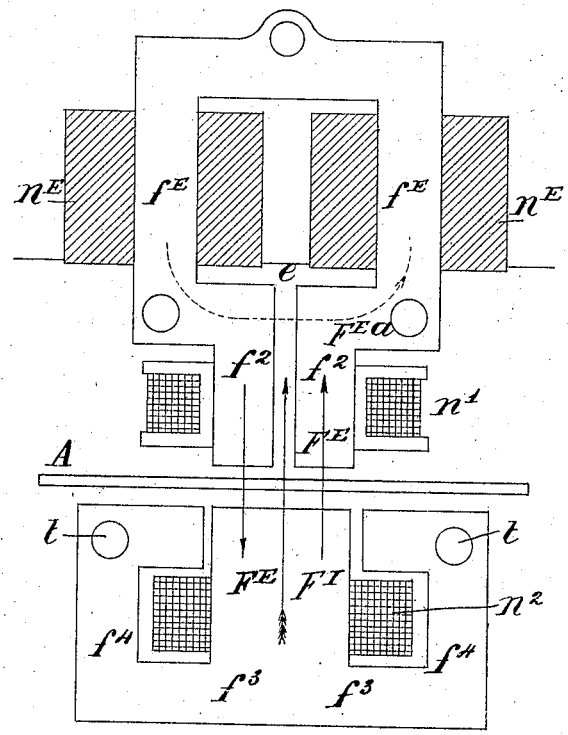
Figure 4:
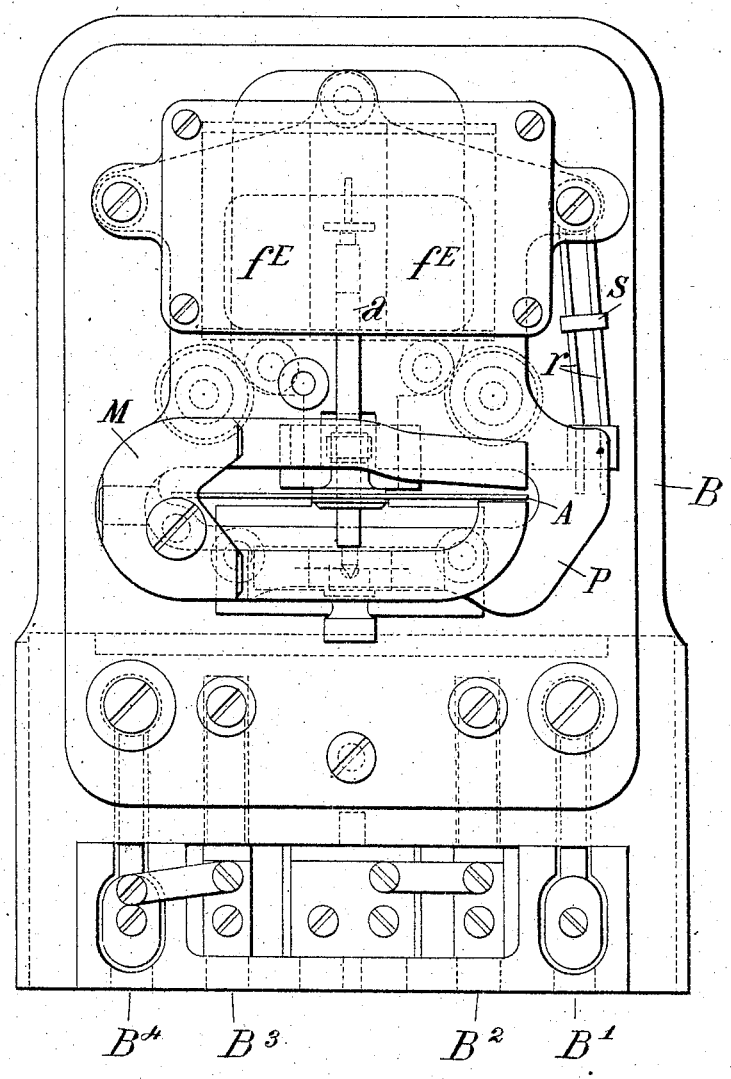

In the accompanying drawings, forming part of the present specification, Figures 1 and 1$^a$ are diagrams of the arrangement of circuits permitting the two above-stated components of current to be obtained. Fig. 1 relates to a general case and Fig. 1$^a$ to a special case. Fig. 2 is a diagram of the currents acting on a meter of my system in the case of the special arrangement shown in Fig. 1$^a$. Fig. 3 is a vector diagram showing the relation between the currents and produced fields. Fig. 4 is a front view of my meter. Fig. 5 is a side elevation; and Fig. 6 is a detail of the coils, together with the magnetic yoke.

The same reference-signs relate to the same parts or quantities.

According to Fig. 1 the differential magnet is energized by two reversely-wound coils $n'$ $n^2$. $n'$ is traversed by the main current I, while coil $n^2$ is traversed by a part $I^2$ of the current, which gives the component lagging behind I and is obtained by shunting this coil on a resistance R. It is not necessary that R should be an ohmic resistance, it being sufficient that its time constant be such as will give $I^2$ a lag with respect to the current $I^{2a}$ traversing the resistance R. As a modification the coil $n'$ itself may be substituted for the resistance R, the coil $n^2$ being shunted on it. This modification is shown in Fig. 1ª.

In Fig. 2 the shunt-magnet is indicated by the coil $n^E$, made of thin wire wound on a laminated-iron core $f^E$. It induces eddy-currents in the rotating armature A, together with the differential magnet, which comprises a coil $n'$, made of thick wire wound on core $f^2$, and a coil $n^2$, reversely wound on the extension $f^3$ of core $f^2$, which is provided with yokes $f^4$ in order to obtain a great displacement of current $I^2$ with respect to $I'$. The exact adjustment of the displacement of the fluxes is obtained by means of a resistance $r$, inserted into the circuit of $I'$ and regulated by the movable contact $s$. The disk A is submitted to the braking action of the magnet M, so as to have its speed always proportional to the watts.

Assuming at a given instant that the main current I, Fig. 2, is in the direction of the arrow, this current will divide at B' and component $I'$ traversing a path of low self-induction embracing the ohmic resistance $r$ and the coil $n'$ in series, while the other component will traverse a path of high self-induction embracing the coil $n^2$. The two components $I'$ $I^2$ will therefore have a relative phase displacement in which the component $I'$ by virtue of its relatively low self-induction will lead, and the component $I^2$ by virtue of its relatively high self-induction will lag behind the main current to an extent dependent upon the adjustment of the resistance $r$. The relative magnetizing effects or strengths of these components of the main current are shown graphically in the vector diagram, Fig. 3, where the line OI represents the main current, OI' the leading component, and OI² a lagging component. The relative strengths of these components are obtained graphically by completing the parallelogram OI' OI², from which it will be seen that the component OI² may be small as compared with OI'. The resultant field is produced not by the combined action of the components I' I², acting on the core in the same direction, but is the resultant effect of the current I' in the coil $n'$, wound in one direction, and a current I² in a coil $n^2$, wound in the opposite direction. Therefore if we let I², Fig. 3, represent the component acting in opposition to the current I' by completing the parallelogram OI² F¹ I' we obtain the resultant effective current or resultant field represented by the line OF'. Then if we let the line OF^E represent the shunt-current and the angle $\varphi^E$ its angle of lag behind the main current I it will be seen that the resultant field is displaced by a fourth of a period or ninety degrees, which fulfils the requirement hereinbefore stated for the proper displacement of the components I' I²— i. e., that the relative displacement of said components and their absolute values are selected and regulated so that the resultant field is displaced a fourth of a period relative to the shunt-field.

In Figs. 3, 4, and 5 the arrangement of the magnets is somewhat different, the mode of action remaining exactly the same. As shown, the shunt-magnet has its two poles brought opposite the disk. The reversely-directed fluxes F^E F^E are concentrated on the disk A by the yoke $f^3$. The core $f^E$ shows a special arrangement in that its lower ends $f^2$ $f^2$ are brought nearly together opposite each other, leaving between them a small air-gap $e$. This arrangement has for its effect, first, to considerably increase the self-induction of the shunt-coils $n^E$ $n^E$ by producing a flux F^Ea, which does not go through the armature, so that the insertion of a powerful braking moment is avoided; second, to permit the location of the main coil $n'$ directly on the poles of the shunt-magnet; third, to bring both poles of the shunt-magnet to the edge of the disk— i. e., in the position of maximum action. The second differential coil $n^2$ is placed on the yoke $f^3$, disposed below the armature, the object of the projections $f^4$ $f^4$ being to render the time constant of coil $n^2$ much greater than that of $n'$, as above stated.

The different magnets constituting the driving part of the meter are fixed on a platen P, together with the braking-magnet M and the pivot-bearings of the armature, in order to secure the perfect rigidity of the whole, which is supported by means of posts B', B², B³, and B⁴ on the base B of the meter.

Besides the adjustment of the time constants obtained by means of the resistance $r$ and bridge $s$ the yoke $f^3$ is made slightly adjustable both in an angular and in a lateral direction. Said adjustment is obtained by making the holes $t$ of larger diameter than the shanks of the fastening-screws, which coöperate with said holes for securing the yoke $f^3$ in position. The yoke may thus be displaced with respect to the screws within the limits of said difference in diameter both in an angular and in a lateral direction, thus rendering the air-gap in which the disk is moving slightly dissymmetrical. By said dissymmetry a twofold advantage is obtained: First, the dissymmetry of the flux of the shunt-electromagnet creates a small torque or starting momentum necessary in order to overcome the friction; second, the dissymmetry of the flux of the current-electromagnet creates an auxiliary torque proportional to the square of the volume of current, which is advantageous in that it raises the curve $$n = f(EI),$$

($n$ being the number of turns per second,) which tends to fall for heavy loads in all apparatus of this kind by reason of the saturation of iron and by reason of a secondary braking momentum which is proportional to the square of the flux of the current-magnet.

What I claim, and desire to secure by Letters Patent of the United States, is—

1. In a rotary field or induction meter, the combination with a shunt-energized flux, displaced less than a fourth of a period with respect to the active electromotive force; of a differential flux produced by two components of the main current, one of which traverses a path of low self-induction and the other of which traverses a path of high self-induction for the purpose of producing a resultant flux displaced a fourth of a period with respect to the flux of the shunt-current, and a rotatable armature acted upon by said fluxes, the speed of said armature being proportional to the current to be recorded, substantially as described.

2. In a rotary field or induction meter, the combination with an electromagnet responsive to voltage, the flux of which is displaced less than a fourth of a period with respect to the active electromotive force; of a differential electromagnet energized by components of the main current and the resultant flux of which is displaced a fourth of a period with respect to the flux of the shunt-current, adjustable resistances adapted and arranged to regulate the relative phase displacement of said components, and a rotatable armature acted upon by said fluxes, substantially as described.

3. In a rotary field or induction meter, the combination with an electromagnet responsive to current, a rotatable armature, an electromagnet responsive to voltage, the poles of which are brought opposite each other near the edge of said armature, substantially as and for the purpose herein stated.

4. In a rotary field or induction meter, the combination with a rotatable armature, of a differential electromagnet energized by components of the main current, acting upon said armature and adapted and arranged to have a bodily displacement in order to produce auxiliary torques proportional to the squares of electromotive force and intensity, substantially as and for the purpose herein specified.

In testimony whereof I have signed my name to this specification in the presence of two subscribing witnesses.

ARTHUR BLANCHET.

Witnesses:
  RENÉ WITTEBALLEY,
  AUGUSTUS E. INGRAM.